United States Patent
Hao et al.

[11] Patent Number: 5,853,614
[45] Date of Patent: Dec. 29, 1998

[54] LONG DECAY LUMINESCENT MATERIAL

[75] Inventors: Qinglong Hao; Qian Xu; Jun Li; Pengcheng Li; Baochan Liu; Atsushi Ogura; Qingfen Hao, all of Fuchu, Japan

[73] Assignees: Beijing Hongye Coating Materials Company, Beijing, China; Chemitech, Inc., Tokyo, Japan

[21] Appl. No.: 897,000

[22] Filed: Jul. 21, 1997

[30] Foreign Application Priority Data

Dec. 17, 1996 [JP] Japan ................................ 8-353559

[51] Int. Cl.$^6$ .......................... C09K 11/08; C09K 11/55; C09K 11/63; C09K 11/77
[52] U.S. Cl. ...................................... 252/301.4 R
[58] Field of Search ....................... 252/301.4 R

[56] References Cited

U.S. PATENT DOCUMENTS 5,376,303  12/1994  Royce et al. .................. 252/301.4 R

*Primary Examiner*—Melissa Bonner
*Attorney, Agent, or Firm*—Michael N. Meller

[57] ABSTRACT

Long decay luminescent materials having improved long decay time and improved high brightness is represented by the formula as $Sr_{0.9995\sim0.998}Eu_{0.0005\sim0.002})Al_2O_4 \cdot (Sr_{0.9995\sim0.998}Eu_{0.0005\sim0.002})O \cdot n(Al_{1-a-b}B_bDy_a)_2O_3$ in it $a=0.0005\sim0.0002$, $b=0.0001\sim0.35$, $n=1\sim8$ and the method for manufacturing the long decay luminescent materials is characterized in heating the raw materials as $SrCo_3$, $\alpha$ type alumina, $\gamma$ type alumina, boron-containing compound, $Eu_2O_3$ and $Dy_2O_3$ gradually from 400° C. up to 1250° C.~1600° C. during 7~10 hours, firing it at 1250° C.~1600° C. for 3~5 hours and then cooing it gradually from 1250° C.~1600° C. down to 200° C. during 7~10 hours and the heating, firing and cooling processes are all conducted under the condition of existence of carbon.

5 Claims, 2 Drawing Sheets

LONG DECAY LUMINESCENT MATERIAL

FIELD OF THE INVENTION

This invention relates to long decay luminescent materials and the method for manufacturing the long decay luminescent materials. More specially, this invention relates to new long decay luminescent materials which can be excited by variety of excitation sources such as sunlight, artificial lamps, specially, by ultraviolet rays with wavelength of 200 to 450 nm and the method for manufacturing the long decay luminescent materials.

BACKGROUND OF THE INVENTION

Copper-activated zinc sulfide, such as ZnS:Cu, is frequently used in such field as watch or clock dials and safety signs. This zinc sulfide absorbs energy of the ultraviolet rays and is activated sequentially. However, the copper activated zinc sulfide is not completely satisfactory since the brightness falls down very rapidly and it is subject to degradation and deterioration when exposed to UV(ultraviolet) radiation in an atmosphere.

So, when the zinc sulfide is used in watch dials, it can keep visible brightness for only 20 minutes to 30 minutes and it can not be used outdoor since its degradation and deterioration caused by ultraviolet rays.

In order to prolong the decay time of the zinc sulfide, a radiative material, for example promethium (Pm), was added into the zinc sulfide to make it long decay.

However, as the radiative materials are harmful to human's body and it is so costly to require using special means for preventing from the radioactiveness and special procedure for treating the industrial waste. Many problems are still not resolved up to now.

On the other hand, a fluorescent material, which differs from the zinc sulfide, having alkaline earth metal aluminate as the host crystal and europium as activator was reported. For example, in U.S. Pat. No. 3,294,699, a strontium aluminate with europium activated ($SrAl_2O_4$:Eu) was described.

The content of the divalent europium is 2~8 mole percent relative to the strontium aluminate. This fluorescent material shows emission peak of 520 nm while activated by the electron beams. But, as the fluorescent material just mentioned does not have long decay performance, it is different from the phosphorescent material.

Furthermore, adding alkaline earth metals to the strontium aluminate activated by the europium to prepare fluorescent materials as $Ba_xSr_yCa_zEu_pAl_{12}O_{19}$ (In the formula x+y+z+p=1, at least one of any x, y, z may be zero and $0.1 \geq p \geq 0.01$) was reported in UK patent No. 1,190,520.

These fluorescent materials show emission peak of 380 to 440 nm while activated by the electron beams and are mainly used for fluorescent lamps.

In recent years, luminescent materials activated by normal light energy and having a long decay time have been developed. For example, in Chinese Patent Application Publication No. CN1053807A, a long decay luminescent material represented by the formula:

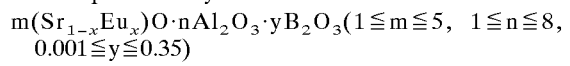

was reported. This luminescent material uses aluminum oxide, strontium oxide, boron oxide and europium oxide or these elements-containing compounds from which the oxides mentioned above can be produced after heated as the raw materials and is prepared by the main process as, fire them at 1200° C. to 1600° C. and then fire them under reducing condition formed by a mixture of nitrogen and hydrogen gas at 1000° C. to 1400° C.

Other than the Chinese invention, U.S. Pat. No. 5,376,303, Japanese Paten Application Publication No. TOKUKAIHEI-1996-170076 and TOKUKAI HEI-1996-127772 published inventions also relating to luminescent materials with long decay and high brightness.

However, the luminescent materials developed up to now last the decay time only for less then 10 hours and are subject to low initial brightness. In order to solve the problems, the inventors of the present invention made repeated efforts and were successful in developing the new luminescent materials that are much better than the traditional zinc sulfide and the alkaline earth metal aluminate activated with europium by having very long decay time as well as very high initial brightness and the method for manufacturing the long decay luminescent materials.

A BRIEF OF THE INVENTION

The object of the invention is to provide new luminescent materials having improved long decay time and improved high initial brightness.

Another object of the invention is to provide a method for manufacturing the invented materials through a simplified process.

The more specific object of the invention is to provide the luminescent materials having green or blue emission light and having improved long decay time and improved high brightness.

The invented luminescent materials is represented by the formula as

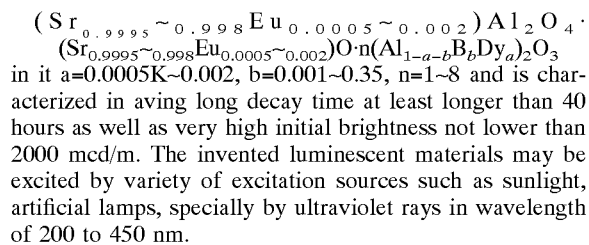

in it a=0.0005K~0.002, b=0.001~0.35, n=1~8 and is characterized in aving long decay time at least longer than 40 hours as well as very high initial brightness not lower than 2000 mcd/m. The invented luminescent materials may be excited by variety of excitation sources such as sunlight, artificial lamps, specially by ultraviolet rays in wavelength of 200 to 450 nm.

The invented luminescent materials, after excited, emit light covering a wide range of 420 nm to 520 nm.

The invented luminescent materials have no toxic effects as well as no radioactivity so they may be used with safety assurance.

The invented method for manufacturing the long decay luminescent materials is characterized in, in the case of n=1 in the formula, grinding the raw materials such as $SrCO_3$, α type Alumina, γ type alumina, boron compound, $Eu_2O_3$, $Dy_2O_3$, mixing them, heating the mixture well mixed gradually from 400° C. up to 1250° C. during 7 to 10 hours, firing it at 1250° C. for 5 to 3 hours, cooling it gradually down to 200° C. during 7 to 10 hours, then grinding and sieving and the processes of heating, firing and cooling are all conducted under the condition of the existence of carbon, and in the case of n=2, after the raw materials are ground and well mixed, heating the mixture gradually during 7 to 10 hours from 400° C. up to 1600° C., firing it at 1600° C. for 3 to 5 hours and then cooling it down to 200° C. during 7 to 10 hours and also the processes of heating, firing and cooling are under the condition of existence of carbon.

Owing to the existence of carbon, a weak reducing atmosphere may be formed, the firing process may be conducted at relatively low temperature and the process for preparing the invented materials is substantially simplified by conducting the firing and reducing simultaneously and without danger of the hydrogen and nitrogen gas.

A DESCRIPTION OF THE DRAWINGS

DESCRIPTION OF THE INVENTION

The inventions are described in detail as follows. When the invented luminescent materials are excited by some energies such as sunlight, heat, shock etc., specially by ultraviolet rays, they convert the energy possessed by themselves into visible rays and emit light for a long time.

The invented materials may be represented by the formula as:

$(Sr_{0.9995\sim0.998}Eu_{0.0005\sim0.002})Al_2O_4 \cdot (Sr_{0.9995\sim0.998}Eu_{0.0005\sim0.002})O \cdot n(Al_{1-a-b}B_bDy_a)_2O_3$ in it a=0.0005~0.002, b=0.001~0.35, n=1~8 and are characterized in having improved long decay time and improved high brightness.

The invented new luminescent materials emit peak wavelength of 489 nm when n=2 and 520 nm when n=1 in the above formula.

The invented new luminescent materials have the advantages as no radioactivity and toxicity.

The invented process is characterized in, in the case of n=1, grinding the raw materials such as $SrCO_3$, α type alumina, γ type alumina, boron compound, $Eu_2O_3$, $Dy_2O_3$, mixing them, heating the mixture well mixed gradually from 400° C. up to 1250° C. during 7 to 10 hours, firing it at 1250° C. for 5 to 3 hours, cooling them gradually down to 200° C. during 7 to 10 hours, then grinding and sieving, and in the case of n=2, after the raw materials are ground and well mixed, heating the mixture gradually during 7 to 10 hours from 400° C. up to 1600° C., firing them at 1600° C. for 3 to 5 hours and then cooling them down to 200° C. during 7 to 10 hours and the processes of heating, firing and cooling are all conducted under the condition of carbon existence.

Owing to the existence of carbon, a weak reducing condition may be formed, the firing process may be conducted at relatively low temperature and the process for preparing the invented materials is much simplified by conducting firing and reducing simultaneously and without danger of the hydrogen and nitrogen gas.

The invented new luminescent materials thus prepared are polysynthetic twinning triclinic crystal structure and have the properties as:

while n=1 in the formula

Figure 1:
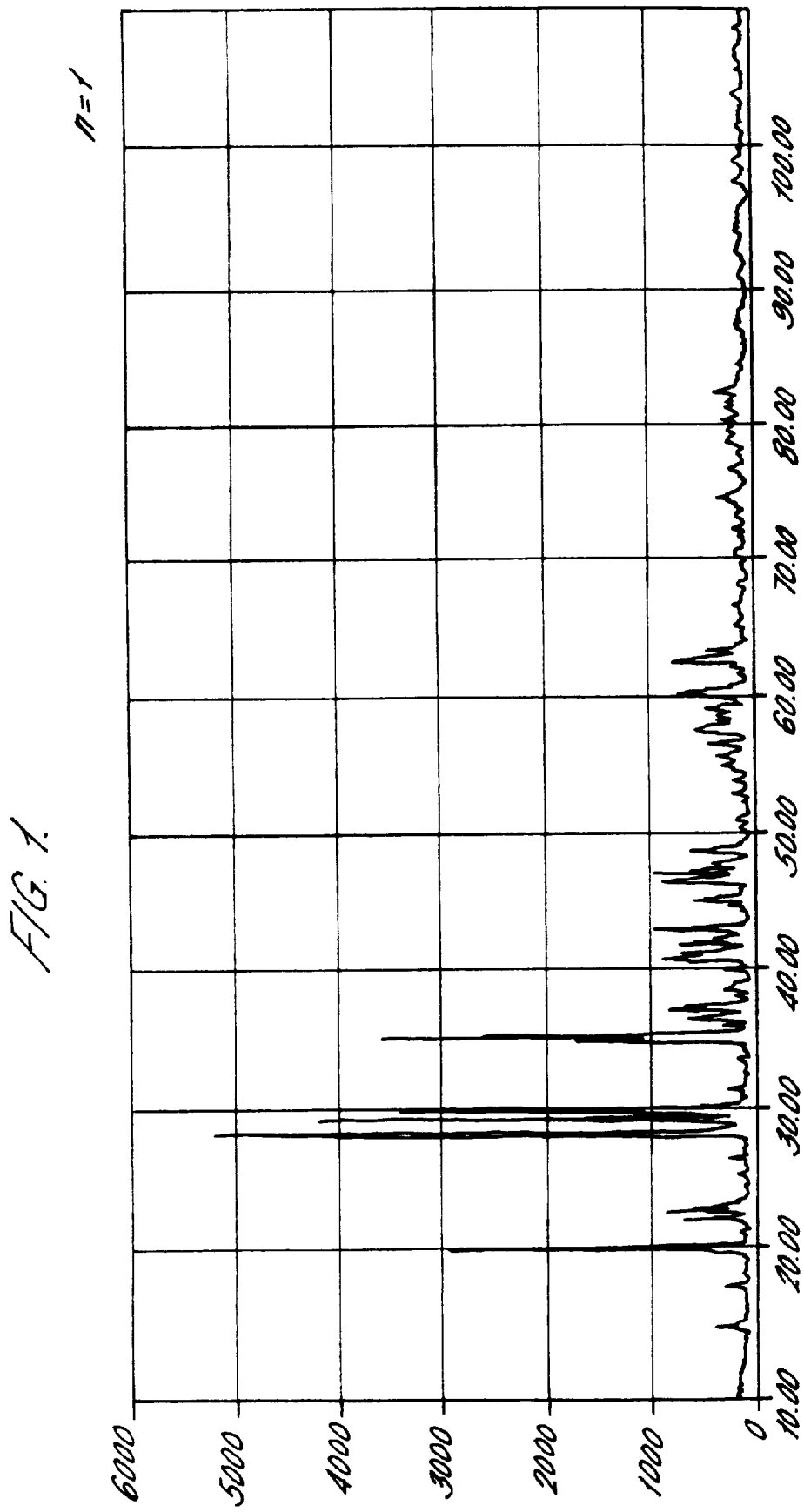
FIG. 1 shows the X-ray pattarn analysis result of the present invention in the case of n=1 in the formula.

| | | |
|---|---|---|
| (1) | Specific Gravity | 3.60~3.62 |
| (2) | Powder's Color | Light yellowish Green |
| (3) | Moh's Hardness | 6.2~6.5 |
| (4) | Emission Peak | 520 nm |
| (5) | Emission Color | Green |
| (6) | Excitation Wavelength | 200~450 nm |
| (7) | Brightness at the 30th Second after Stopping Excitation | >4000 mcd/m |
| (8) | Decay Time | >40 hours |
| (9) | X-ray pattarn Analysis Result | Shown in FIG. 1 | while n = 2 in the formula

| | | |
|---|---|---|
| (1) | Specific Gravity | 3.69~3.71 |

-continued

Figure 2:
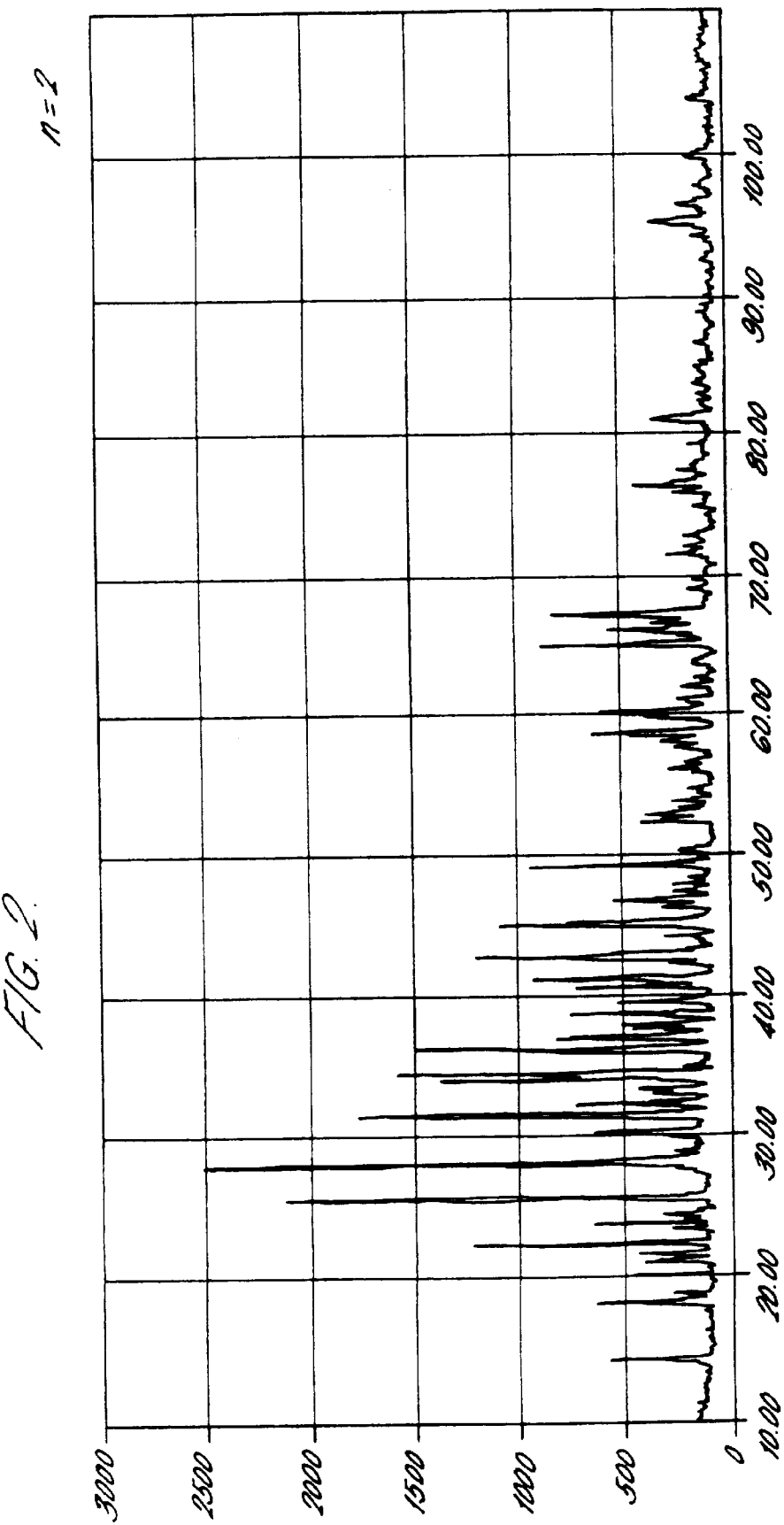
FIG. 2 shows the the X-ray pattarn analysis result of the present invention in the case of n=2 in the formula.

| | | |
|---|---|---|
| (2) | Powder's Color | Light yellowish Green |
| (3) | Moh's Hardness | 7.0~7.5 |
| (4) | Emission Peak | 489 nm |
| (5) | Emission Color | Blue |
| (6) | Excitation Wavelength | 200~450 nm |
| (7) | Brightness at the 30th Second after Stopping Excitation | >2000 mcd/m |
| (8) | Decay Time | >60 hours |
| (9) | X-ray pattarn Analysis Result | Shown in FIG. 2 |

The invented method for manufacturing the new luminescent materials are described in detail as follows.

Strontium carbonate or strontium oxide, α type alumina and γ type alumina, boron oxide or boron compound, europium oxide and dysprosium oxide are used as the raw materials.

Specially, the α type alumina shares 50% to 99% of the whole quantity of the alumina and the γ type alumina shares the other, namely, 50% to 1%.

Particularly, both of a good brightness and a good decay time will obtain when the α type alumina shares 90% to 80% of the whole alumina. The boron-containing compound may be present in an amount such as to produce from 0.001 to 0.35 mole percent boron as compared with the total molar content of aluminum.

Preferably, the boron-containing compound may be present in an amount such as to produce from 0.1 to 0.2 mole percent boron as compared with the total molar content of aluminum.

The experiment results show that when "b" in the formula is smaller than 0.001, the decay time of the product goes shorter and when the "b" is bigger than 0.35, a reduction trend of the brightness of the product appears.

The europium oxide may be present in an amount of producing from 0.0005 to 0.002 mole percent europium as compared with the total molar content of the strontium.

The experiments show also when the "a" is smaller than 0.0005, luminescent materials with high brightness can not be obtained and, when the "a" is bigger than 0.35, concentration quenching occurs.

Europium-containing compounds may also be used as the raw material.

Besides the europium used as the activator, dysprosium is used in the invention as the co-activator. Dysprosium oxide or dysprosium-containing compounds may be the raw materials for provide the dysprosium.

The dysprosium oxide or the dysprosium-containing compounds may be present in an amount of producing from 0.0005 to 0.002 mole percent dysprosium as compared with the total molar content of the aluminium.

The experiments show also when the "a" is smaller than 0.0005, luminescent materials with high brightness can not be obtained and, when the "a" is bigger than 0.35, concentration quenching occurs.

The brightness of the new luminescent materials may be further improved by adding dysprosium.

One or more other rare earth elements such as La, Ce, Pr, Nd, Sm, Gd, Tb, Ho, Er, Tm, Yb, Lu etc. may also be added in the the invented luminescent materials.

The invented method for manufacturing the new luminescent materials are described in more detail as follows.

The invented method for manufacturing the new luminescent materials is composed of the processes as, while n=1 in the formula, grinding the raw materials as $SrCO_3$, α type alumina, γ type alumina, boric acid, europium oxide and dysprosium oxide, mixing them well, heating the mixture gradually from 400° C. to 1250° C. during 7 to 10 hours, firing them at temperature of 1250° C. for 3 to 5 hours and then cooling them gradually from 1250° C. down to 200° C. during 7 to 10 hours and while n=2 in the formula, grinding the raw materials as $SrCO_3$, α type alumina, γ type alumina, boric acid, europium oxide and dysprosium oxide, mixing them well, heating the mixture gradually from 400° C. to 1600° C. during 7 to 10 hours, firing them at temperature of 1600° C. for 3 to 5 hours and then cooling them gradually from 1600° C. down to 200° C. during 7 to 10 hours.

The heating, firing and cooling are all conducted under the condition of carbon existence.

The emission colors shift from 520 nm to shorter along with the "n" goes bigger. When n=1 in the formula, the emission wavelength of the new luminescent material is 520 nm and when n=2, it is about 489 nm.

While mixing the ground raw materials respectively, it is better to mix the α type alumina with the γ type alumina first and then mix them with the others.

The processes of heating, firing and cooling are all conducted under the reducing atmosphere formed by the carbon. The raw mixture is put in a crucible which is buried in carbon powders so as to avoid direct contact of the raw materials with air.

Instead of the carbon powders, a mixture of nitrogen and hydrogen gas may also be used to form the reducing atmosphere.

Owing to the existence of carbon, a weak reducing atmosphere may be formed, the firing process may be conducted at relatively low temperature and the process for preparing the invented materials is substantially simplified by conducting firing and reducing simultaneously and without danger of the hydrogen and nitrogen gas.

The new long decay luminescent materials represented by the formula mentioned above are thus manufactured by the invented method. And, the new long decay luminescent materials have the polysynthetic twinning triclinic crystal structure.

The invented new luminescent materials may be mixed with ink, paint or kneaded into resins to produce luminescent ink, luminescent paint and luminescent resins for safety markings, position markings or used in buildings or for decorations and ornaments.

It is also possible to use the luminescent materials in liquid crystal displayer as backlight auxiliary source.

EXAMPLES OF THE INVENTION EMBODIMENTS

The inventions will be now described in detail with respect to the specific preferred embodiments thereof, but the new luminescent materials and the method for manufacturing them are intended to be described only.

The inventions are not intended to be limited to the materials, process, parameters and the likes recited by the examples.

Example 1

| | |
|---|---|
| $SrCO_3$ | 14.73 g |
| $\alpha-Al_2O_3$ | 9.93 g |
| $\gamma-Al_2O_3$ | 0.10 g |
| $H_3BO_3$ | 0.22 g |
| $Eu_2O_3$ | 0.035 g |
| $Dy_2O_3$ | 0.037 g |

Grind the raw materials respectively, mix them well in 4 hours at least.

Put the mixture in a crucible and bury the crucible in carbon powders.

Put the crucible with the carbon powders into a electric furnace preheated to 400° C. and then the electric furnace is so regulated as the temperature is raised from 400° C. to 1250° C. during 8 hours gradually. Fire the mixture at 1250° C. for 4 fours and sequently cool it gradually from 1250° C. down to 200° C. during 8 hours. And last the product thus obtained is ground and sieved by 200 mesh for evaluation. The sample 1 thus manufactured has the properties as:

| | |
|---|---|
| Emission peak | 520 nm |
| Emission color | Green |
| Decay time | >40 hours |
| Brightness at the 30th second after stopping the excitation | 4500 mcd/m |
| Specific gravity | 3.60 |
| Moh's hardness | 6.2 |
| X-ray pattarn analysis | shown in FIG. 1 |

Example 2

| | |
|---|---|
| $SrCO_3$ | 147.32 g |
| $\alpha-Al_2O_3$ | 80.63 g |
| $\gamma-Al_2O_3$ | 14.23 g |
| $H_3BO_3$ | 8.44 g |
| $Eu_2O_3$ | 0.352 g |
| $Dy_2O_3$ | 0.373 g |

The example 2 was prepared by the same method as the example 1 and has the properties as:

| | |
|---|---|
| Emission Peak | 520 nm |
| Emission color | Green |
| Decay time | >50 hours |
| Brightness at the 30th second after stopping the excitation | 5300 mcd/m |
| Specific gravity | 3.62 |
| Moh's hardness | 6.3 |

Example 3

| | |
|---|---|
| $SrCO_3$ | 14.73 g |
| $\alpha-Al_2O_3$ | 13.71 g |
| $\gamma-Al_2O_3$ | 5.86 g |
| $H_3BO_3$ | 0.94 g |
| $Eu_2O_3$ | 0.035 g |
| $Dy_2O_3$ | 0.075 g |

Grind the raw materials respectively, mix them well in 4 hours at least.

Put the mixture in a crucible and bury the crucible in carbon powders. Put the crucible with the carbon powders into a electric furnace preheated to 400° C. and then the electric furnace is so regulated as the temperature is raised from 400° C. to 1600° C. during 8 hours gradually. Fire the mixture at 1600° C. for 4 fours and sequently cool it gradually from 1600° C. down to 200° C. during 8 hours. And last the product thus obtained is ground and sieved by 200 mesh for evaluation. The sample 3 thus manufactured has the properties as:

| | |
|---|---|
| Emission peak | 489 nm |
| Emission color | Blue |
| Decay time | >50 hours |
| Brightness at the 30th second after stopping the excitation | 2100 mcd/m |
| Specific gravity | 3.70 |
| Moh's hardness | 7.3 |
| X-ray pattarn analysis | shown in FIG. 2 |

Example 4

| | |
|---|---|
| $SrCO_3$ | 147.32 g |
| $\alpha\text{-}Al_2O_3$ | 156.13 g |
| $\gamma\text{-}Al_2O_3$ | 34.27 g |
| $H_3BO_3$ | 16.88 g |
| $Eu_2O_3$ | 0.352 g |
| $Dy_2O_3$ | 0.746 g |

The sample 4 was manufactured by the same method as the sample 3.

The sample 4 thus manufactured has the properties as:

| | |
|---|---|
| Emission peak | 490 nm |
| Emission color | Blue |
| Decay time | >70 hours |
| Brightness at the 30th second after stopping the excitation | 2300 mcd/m |
| Specific gravity | 3.72 |

Comparative Example 1

| | |
|---|---|
| $SrCO_3$ | 14.73 g |
| $\alpha\text{-}Al_2O_3$ | 9.67 g |
| $\gamma\text{-}Al_2O_3$ | 0.51 g |

Other raw materials other than that listed above are the same as the sample 1. The comparative sample 1 was manufactured by the same method as the sample 1. The comparative sample 1 thus manufactured was white in the powder's color without luminescent performance.

Comparative Example 2

| | |
|---|---|
| $SrCO_3$ | 14.73 g |
| $\alpha\text{-}Al_2O_3$ | 10.03 g |
| $\gamma\text{-}Al_2O_3$ | 0.00 g |

Other raw materials other than that listed above are the same as the sample 1. The comparative sample 1 was manufactured by the same method as the sample 1.

The comparative sample 2 thus manufactured was light green in the powder's color and its decay time lasts only for 30 minutes.

Comparative Example 3

| | |
|---|---|
| $SrCO_3$ | 14.73 g |
| $\alpha\text{-}Al_2O_3$ | 0.00 g |
| $\gamma\text{-}Al_2O_3$ | 10.03 g |

Other raw materials other than that listed above are the same as the sample 1. The comparative sample 1 was manufactured by the same method as the sample 1.

The comparative sample 3 thus manufactured was light green in the powder's color with initial brightness of about 1100 mcd/m and decay time of about 2 hours.

What is claimed is:

1. The long decay luminescent materials is represented by the formula as $$(Sr_{0.9995 \sim 0.998}Eu_{0.0005 \sim 0.002})Al_2O_4 \cdot (Sr_{0.9995 \sim 0.998}Eu_{0.0005 \sim 0.002})O \cdot n(Al_{1-a-b}B_bDy_a)_2O_3$$

in it $a=0.0005 \sim 0.002$, $b=0.001 \sim 0.35$, $n=1 \sim 8$ and is characterized in having improved long decay time and improved high brightness.

2. The long decay luminescent materials of claim 1 wherein when the n=1, the long decay luminescent material has the properties as:

| | | |
|---|---|---|
| (1) | Specific Gravity | 3.60~3.62 |
| (2) | Powder's Color | Light yellowish Green |
| (3) | Moh's Hardness | 6.2~6.5 |
| (4) | Emission Peak | 520 nm |
| (5) | Emission Color | Green |
| (6) | Excitation Wavelength | 200~450 nm |
| (7) | Brightness at the 30th Second after Stopping Excitation | >4000 mcd/m |
| (8) | Decay Time | >40 hours |
| (9) | X-ray pattarn Analysis Result | Shown in FIG. 1 |

3. The long decay luminescent materials of claim 1 wherein when the n=2, the long decay luminescent material has the properties as:

| | | |
|---|---|---|
| (1) | Specific Gravity | 3.69~3.71 |
| (2) | Powder's Color | Light yellowish Green |
| (3) | Moh's Hardness | 7.0~7.5 |
| (4) | Emission Peak | 489 nm |
| (5) | Emission Color | Blue |
| (6) | Excitation Wavelength | 200~450 nm |
| (7) | Brightness at the 30th Second after Stopping Excitation | >2000 mcd/m |
| (8) | Decay Time | >60 hours |
| (9) | X-ray pattarn Analysis Result | Shown in FIG. 2 |

4. The method for manufacturing the long decay luminescent materials described in claim 2 is characterized in grinding such raw materials as $SrCO_3$, $\alpha$ type $Al_2O_3$, $\gamma$ type $Al_2O_3$, boron-containing compound, $Eu_2O_3$, $Dy_2O_3$, mixing them, heating the mixture thus mixed gradually from 400° C. up to 1250° C. during 7~10 hours, firing it at 1250° C. for 5~3 hours, then cooling it from 1250° C. down to 200° C. gradually during 7~10 hours, and at last grinding and sieving, and the processes of heating, firing and cooling are all conducted under the condition of existence of carbon.

5. The method for manufacturing the long decay luminescent materials described in claim 3 is characterized in grinding such raw materials as SrCO, $\alpha$ type $Al_2O_3$, $\gamma$ type $Al_2O_3$, boron-containing compound, $Eu_2O_3$, $Dy_2O_3$, mixing them, heating the mixture thus mixed gradually from 400° C. up to 1600° C. during 7~10 hours, firing it at 1600° C. for 5~3 hours, then cooling it from 1600° C. down to 200° C. gradually during 7 to 10 hours, and at last grinding and sieving, and the processes of heating, firing and cooling are all conducted under the condition of existence of carbon.

* * * * *